United States Patent [19]

von Bonin

[11] 4,390,672

[45] Jun. 28, 1983

[54] MALEIC ACID ANHYDRIDE COPOLYMERS AND THEIR PREPARATION

[75] Inventor: Wulf von Bonin, Leverkusen, Fed. Rep. of Germany

[73] Assignee: Bayer Aktiengesellschaft, Leverkusen, Fed. Rep. of Germany

[21] Appl. No.: 318,473

[22] Filed: Nov. 5, 1981

[30] Foreign Application Priority Data

Nov. 11, 1980 [DE] Fed. Rep. of Germany ....... 3042471

[51] Int. Cl.³ ............................................. C08F 2/38
[52] U.S. Cl. ..................................... 526/209; 526/271
[58] Field of Search ............................. 526/271, 209

[56] References Cited

U.S. PATENT DOCUMENTS

| | | | |
|---|---|---|---|
| 2,415,400 | 2/1947 | Armstrong | 260/78 |
| 2,479,522 | 8/1949 | Strain | 260/78.5 |
| 2,533,376 | 12/1950 | Jones | 260/78.4 |
| 2,562,852 | 7/1951 | Baer | 260/78.5 |
| 2,587,442 | 2/1952 | Carlson | 260/77.5 |
| 2,640,819 | 6/1953 | Barrett | 260/78.5 |
| 2,855,387 | 10/1958 | Barrett | 260/78.5 |
| 2,935,484 | 5/1960 | Arnold et al. | 260/17.4 |
| 3,385,834 | 5/1968 | Merijan | 260/78.4 |
| 3,838,113 | 9/1974 | Smallman | 260/78.5 R |
| 4,141,934 | 2/1979 | Wingler et al. | 260/881 |

*Primary Examiner*—Joseph L. Schofer
*Assistant Examiner*—Bernard Lipman
*Attorney, Agent, or Firm*—Connolly & Hutz

[57] ABSTRACT

Maleic acid anhydride copolymers, especially those with (meth)acrylic acid or their derivatives, are advantageously produced by radical polymerization in the maleic acid anhydride melt.

4 Claims, No Drawings

MALEIC ACID ANHYDRIDE COPOLYMERS AND THEIR PREPARATION

This invention relates to a process for the preparation of copolymers of maleic acid anhydride, (meth)acrylic acid or (meth)acrylic acid derivatives and optionally other comonomers by radical polymerisation in molten maleic acid anhydride and to the copolymers thereby produced.

Copolymers of maleic acid anhydride have long been known. Compounds such as 1-olefins, aromatic vinyl compounds, vinyl esters and vinyl ethers have proved satisfactory for use as comonomers whereas, for example, (meth)acrylic acid and (meth)acrylic acid derivatives have proved difficult to copolymerise with maleic acid anhydride. Since maleic acid anhydride generally reacts very vigorously with the first mentioned comonomers, maleic acid anhydride copolymers have hitherto been prepared in solvents or suspensions which were subsequently worked up to isolate the product. Melt polymerisations carried out by the hitherto known methods use only minor quantities of maleic acid anhydride as comonomer.

It has surprisingly been found that maleic acid anhydride, which melts at 52° C., may be used as polymerisation medium itself at temperatures above its melting point, in particular for copolymerisation with (meth)acrylic acid and derivatives thereof, without any uncontrollable reactions taking place which would result in unreproducible and unusable products.

In the course of polymerisation, maleic acid anhydride is built into the polymers which are being formed and at the same time polymerisation is controlled so that the polymers obtained are stirrable at temperatures below 200° C. This effect is enhanced in particular by the addition of so-called regulators. This dispenses with the need for additional solvents or dispersing agents although these may be added, if desired, in quantities of up to 20% by weight of the maleic acid anhydride. Suitable solvents or dispersing agents for this purpose include, for example, hydrocarbons, halogenated hydrocarbons, ethers, ketones, esters and mixtures thereof. Since, however, solvents generally inhibit the process of polymerisation in that they tend to reduce the velocity of polymerisation and the quantity of maleic acid anhydride built into the polymers, such additions are as far as possible avoided, and elaborate procedures for isolating and working up the end products are thereby also obviated.

The present invention provides a process for the preparation of maleic acid anhydride copolymers which is characterised in that maleic acid anhydride is polymerised in the melt by radical polymerisation with monomers, in particular with (meth)acrylic acid and/or derivatives thereof, and optionally other copolymerisable monomers in the presence of regulators and initiators at temperatures in the range of from 60° to 200° C. The following quantities are used, based on the total quantity of monomers put into the process, including also the maleic acid anhydride which initially serves as reaction medium: 90 to 20% by weight, preferably 75 to 30% by weight, of maleic acid anhydride and 10 to 80% by weight, preferably 20 to 70% by weight, of comonomers, at least 50% by weight, preferably 65% by weight of this quantity of comonomer consisting of (meth)acrylic acid or derivatives thereof.

The invention also relates to the copolymers produced by this process, consisting of 90 to 20% by weight, preferably 75 to 30% by weight, of maleic acid anhydride and 10 to 80% by weight, preferably 25 to 70% by weight, of comonomers, at least 50% by weight of this quantity of comonomers consisting of (meth)acrylic acid or derivatives thereof. At least 65% by weight of the quantity of comonomers preferably consists of acrylic monomers.

Based on the total quantity of monomers, from 0.01 to 2% by weight, preferably from 0.1 to 1% by weight, of initiators and from 0 to 5% by weight, preferably from 0.3 to 1.5% by weight, of regulators are added.

Suitable initiators for radical polymerisation include the known initiators based on redox systems, azo compounds or peroxidic compounds. High energy radiation or heat may also be employed. Specific examples of initiators include azodiisobutyronitrile, tert.-butyl peroctoate and ditert.-butyl peroxide.

The regulators used may be compounds already known for this purpose, for example, phenols or mercaptans. They may either form part of the reaction mixture initially introduced into the reaction vessel or they may be added with the comonomers introduced into the mixture or they may be contained in both phases. Enol ethers of tetrahydrobenzaldehydes have proved to be particularly valuable regulators for the purpose of this invention, e.g. benzyl enol ethers of 1,2,5,6-tetrahydrobenzaldehyde (1,2,5,6-tetrahydrostyrylbenzylether).

In the method employed for polymerisation, the molten maleic acid anhydride initially constitutes the polymerisation medium. As polymerisation progresses and most of the maleic acid anhydride initially present has been used up by copolymerisation, the function of polymerisation medium may be taken over by the polymer melt. Unreacted maleic acid anhydride may either be left in the polymers or removed by extraction or distillation. Whenever complete conversion of the maleic acid anhydride is not important, the maleic acid anhydride would be used in excess by weight over the other comonomers, and the polymer would subsequently be separated from the excess maleic acid anhydride. If, however, the maleic acid anhydride which originally functions as polymerisation medium is required to be included in the polymerisation process as completely as possible, it is advisable first to polymerise a solution of part of the quantity of comonomer containing the necessary auxiliary substances in the excess maleic acid anhydride and subsequently to add further portions of the comonomer reaction solution, optionally with additional quantities of maleic acid anhydride. Polymers containing a proportion of comonomers exceeding the quantity of maleic acid anhydride used may easily be obtained by this method.

Polymerisation is preferably carried out at 120° to 180° C., optionally under pressure. Although it is advisable to carry out polymerisation in an inert gas atmosphere in order to avoid discolourations, it may also be carried out without a protective gas.

Examples of suitable (meth)acrylic acid compounds include acrylic acid, methacrylic acid and the esters of these acids with aliphatic, araliphatic, cyclic or aromatic alcohols, in particular esters of aliphatic alcohols having 1 to 22 carbon atoms, preferably esters of methanol, ethanol, propanol, butanol, dodecanol, octadecanol, cyclohexanol and benzyl alcohol. Other suitable derivatives of acrylic and methacrylic acid include the corresponding nitriles, amides and N-substituted amides, such as acrylonitrile, acrylamide, acrylamidemethylolether, diacetone acrylamide, N-ethylacrylamide and the corresponding methacrylic acid derivatives.

Preferred acrylic and methacrylic monomers according to the invention are methacrylic acid, acrylic acid and aliphatic esters of these acids with alcohols having 1 to 18 carbon atoms.

As additional monomers capable of radical polymerisation there may be used, for example, olefins such as ethylene, propylene, 1-butene, 1-hexene, 1-octene, isobutene, diisobutylene, limonene, cyclohexene, norbornene, butadiene, isoprene and 1-octadecene; vinyl compounds such as vinyl esters, e.g. vinyl acetate, vinyl pivalate, vinyl propionate and isopropenyl acetate; vinyl halides such as vinyl chloride and vinylidene chloride; aromatic vinyl compounds such as vinyl naphthalene, styrene, vinyl pyridine and vinyl pyrrolidone; vinyl amide such as vinyl acetamide; vinyl ethers such as vinyl methyl ether, vinyl ethyl ether and vinyl isobutyl ether; and other vinyl compounds, such as vinyl methyl ketone and vinyl ethyl sulphone; allyl compounds such as esters and ethers of allyl alcohol; acrolein and its acetals or anhydrides; full esters or partial esters of itaconic acid, fumaric acid and maleic acid and imides and amides of these acids, such as maleic imide, N-cyclohexylmaleic imide, N-phenyl maleic imide and N-methyl maleic imide.

The polymers which may be obtained according to the invention are valuable intermediate products for polymer analogous reactions, e.g. on the anhydride group. They may be used in the form of their aqueous, alkaline or ammoniacal solutions as emulsifiers, dispersing agents, sizes, sequestering agents, paper auxiliaries, adhesives, tanning agents, auxiliaries for the photographic industry, antistatic agents, and auxiliaries for cement processing, for rinsing bores and for dye formulations. The polymers themselves are suitable as components of adhesives and additives for lacquers, plastics and rubber. Their anhydride groups enable them to function as cross-linking agents or to be themselves cross-linked. They may be used as bonding agents in plastics or for the production of foils. They are thermoplastic or may be processed from solution, emulsion or suspension.

EXAMPLE 1

60 g of methacrylic acid and 0.4 g of di-t-butyl peroxide are introduced into 150 g of maleic acid anhydride at 80° C. in a reaction vessel equipped with a reflux condenser. The reaction mixture is heated to 150° C. with stirring. Polymerisation sets in at this temperature. The polymerisation suspension is filtered off after 3 hours at about 80° C. About 75 g of polymer are isolated, dissolved in ammonia and subsequently precipitated with hydrochloric acid. The IR spectrum of the purified polymer shows amide bands as a result of the reaction of the built-in maleic anhydride groups with ammonia. Potassium salts of the polymer may be used as antistatic agents.

EXAMPLE 2

150 g of maleic acid anhydride, 50 g of acrylic acid, 5 of 1,2,5,6-tetrahydrostyrylbenzylether and 0.4 g of azodiisobutyronitrile are introduced into a reaction vessel equipped with a reflux condenser and a stirrer. The reaction mixture is heated to 80° C. Approximately 15 minutes after the reaction temperature has been reached, the mixture first becomes cloudy and the polymer then precipitates as a soft, easily stirrable phase. The temperature is raised to 130° C. and a solution of 0.1 g of t-butylperoctoate and 0.2 g of di-t-butyl peroxide in 50 g of acrylic acid is introduced dropwise into the reaction mixture with stirring within 15 minutes. A viscous, easily stirrable homogeneous polymer phase is obtained. 10 minutes after introduction of the first portion of monomer, the reaction temperature is raised to 150° C. and a solution of 0.2 g of di-t-butyl peroxide in 50 g of acrylic acid is introduced after about 10 minutes. A homogeneous, easily stirrable polymer melt is obtained. After further stirring for one hour, this melt is poured out on a support, where it solidifies.

The evaporation loss at 150° C. is less than 10%.

Solutions of the polymer in water may be used as sequestering agents. Solutions of the acrylic acid maleic anhydride copolymer in aqueous ammonia may be used as watersoluble adhesives or as dispersing agents.

EXAMPLE 3

150 g of maleic acid anhydride are heated to 80° C. together with 1.5 g of 1,2,5,6-tetrahydrostyrylbenzyl ether, 0.4 g of t-butyl peroctoate and 50 g of acrylonitrile. Polymerisation sets in approximately 5 minutes after the reaction temperature has been reached, and a polymer suspension is formed. The temperature is raised to 120° C. after about one hour, and a solution of 0.2 g of t-butylperoctoate and 0.4 g of di-t-butyl peroxide in 100 g of acrylonitrile as well as 3 g of the enol ether are added in the course of about 50 minutes. The reaction mixture is then stirred for a further 3 hours. An easily stirrable pasty polymer suspension is obtained. This is boiled up with acetone. The purified polymer obtained is completely soluble in dimethylformamide and the IR spectrum shows bands for the anhydride group. It may be used as a reactive filler for rubber or polyurethanes.

EXAMPLE 4

150 g of maleic acid anhydride are heated to 150° C. A solution of 0.1 g of t-butyl peroctoate and 2 g of di-t-butylperoxide in 300 g of butyl acrylate is added in the course of 1.5 hours.

A viscous, homogeneous polymer solution is first formed. When the total quantity of monomers has been introduced, this solution becomes increasingly viscous but remains easily stirrable. Approximately 1.5 hours after introduction of the monomer and vigorous stirring at 150° to 160° C., the polymer melt is discharged. The polymer is soluble in aqueous ammonia. It may be used as an emulsifier in the form of these solutions. The polymer itself may be used as a thermoplastic adhesive.

EXAMPLE 5

150 g of maleic acid anhydride are heated to 120° C. A solution of the following components is then introduced into the autoclave reactor in the course of 0.5 hours with stirring: 70 g of vinyl acetate, 80 g of methyl methacrylate, 5 g of 1,2,5,6-tetrahydrostyrylbenzylether, 0.4 g of t-butyl peroctoate and 1.2 g of di-t-butyl peroxide. The highly viscous, stirrable polymer melt which forms is then stirred for 0.5 hours at 120° C. The polymer is soluble in aqueous ammonia. These solutions may be used as dispersing agents.

EXAMPLE 6

150 g of maleic acid anhydride are heated to 120° C. A solution of the following components is introduced into the reaction vessel in the course of 0.5 hours with stirring: 40 g of styrene, 60 g of acrylic acid, 5 g of 1,2,5,6-tetrahydrostyrylbenzylether, 0.2 g of t-butyl peroctoate and 0.3 g of di-t-butyl peroxide. The temperature is raised to 150° C. during the introduction of the solution, and the reaction mixture is then stirred at 160° C. for 0.5 hours. A highly viscous, stirrable polymer melt is obtained. This is size reduced after cooling and boiled with water. The polymer is soluble in aqueous ammonia and may be used as a dispersing agent.

I claim:

1. A process for the preparation of maleic acid anhydride copolymers with (meth)acrylic acid by radical polymerization in the solvent-free maleic acid anhydride melt in the presence from 0.01 to 2% by weight of initiators at temperatures from 60° to 200° C. comprising polymerizing in the presence of from 0.3 to 1.5% by weight of enol ethers of tetrahydrobenzaldehydes as regulators.

2. A process according to claim 1, wherein 90 to 20% by weight of maleic acid anhydride and 10 to 80% by weight of (meth)acrylic acid are copolymerized.

3. A process according to claim 1, wherein 75 to 30% by weight of maleic acid anhydride and 25 to 70% by weight of (meth)acrylic acid are copolymerized.

4. A process according to claim 1, wherein the regulator is 1,2,5,6-tetrahydrostyrylbenzyl ether.